W. P. WENTWORTH.

Improvement in Snow Shovels.

No. 4,835. Reissued March 26, 1872.

*Witnesses,*

C. A. Poole.

John R. Young

*Inventor,*

William P. Wentworth, by Prindle and Co., his attys

AM. PHOTO-LITHOGRAPHIC CO. N.Y. (OSBORNE'S PROCESS.)

UNITED STATES PATENT OFFICE.

WILLIAM P. WENTWORTH, OF SENECA FALLS, NEW YORK, ASSIGNOR OF ONE-HALF INTEREST TO MAYNARD MILLER.

IMPROVEMENT IN SNOW-SHOVELS.

Specification forming part of Letters Patent No. 107,314, dated September 13, 1870; reissue No. 4,835, dated March 26, 1872.

*To all whom it may concern:*

Be it known that I, WM. P. WENTWORTH, of Seneca Falls, in the county of Seneca and State of New York, did invent certain new and useful Improvements in Snow-Shovels, for which Letters Patent No. 107,314 were issued to me on the 13th day of September, 1870, which Letters Patent have been found defective in that the specification and claims do not cover and embrace all of the original invention and improvements as contained in the model and drawings filed in the United States Patent Office on the 8th day of April, 1870. Now, therefore, being desirous to reissue the said Letters Patent in the manner and form prescribed by law, I have prepared and do hereby declare that the following is a full, clear, and exact description of the said improvements, reference being had to the accompanying drawing making a part of this specification, in which—

Figure 1:
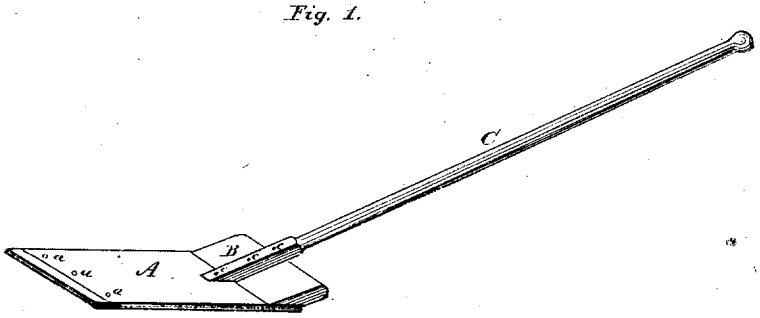
Figure 2:
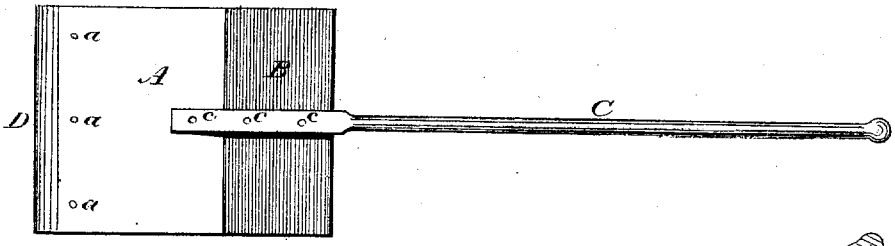
Figure 3:
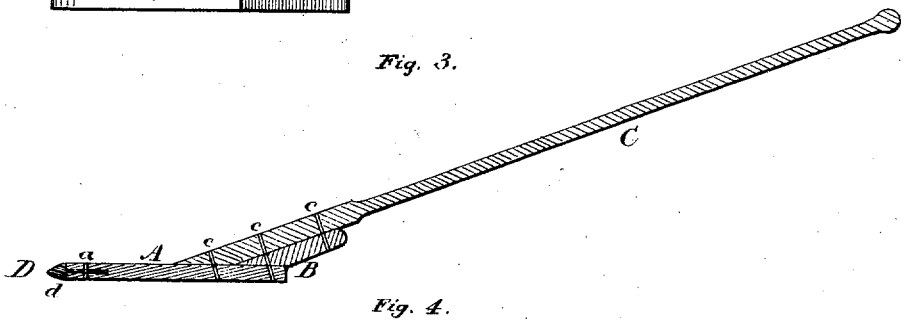
Figure 4:
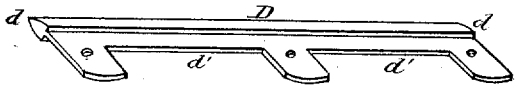

Figure 1 is a perspective view of my device. Fig. 2 is a plan view of the upper side of the same. Fig. 3 is a central longitudinal section of said device; and Fig 4 is an enlarged perspective view of the metal blade-tip.

Letters of like name and kind refer to like parts in each of the figures.

My invention is an improvement in snow-shovels constructed principally of or from wood; and it consists, principally, in the peculiar construction and attachment of the metallic tip of the blade, substantially as and for the purpose hereinafter specified. It consists further in the peculiar construction and combination of the back-piece, blade, and handle, substantially as and for the purpose hereinafter shown.

In the annexed drawing, A represents the blade of the shovel, constructed of wood in the form shown, and having secured to or upon its rear end a wooden back-piece, B, which from thence extends upward and outward at an angle of about thirty degrees. The handle C, also of wood, extends downward across the longitudinal center of the back piece B, and has its lower end beveled upon the lower side, so as to cause it to conform to the angle of the blade and fit closely down upon the same, in which position said handle is secured to said blade and back piece by means of two or more bolts, C, which pass downward through said parts. When thus constructed and combined, each of the three parts named add to and receive strength from the others, by which means the durability of the shovel is largely increased, and all liability to the splitting of the blade prevented. In order that the forward or cutting-edge of the blade may be properly protected from injury and wear, it is provided with a metal tip, D, which, as seen in Figs. 2 and 3, has a length corresponding to the width of said blade, and a shape in cross-section very nearly resembling an arrow, the barbed or pointed head *d* having a vertical depth at its rear end corresponding to the thickness of said blade, while from said head projects rearward a thin flange, *d'*, having parallel sides, and provided with a number of small openings, *d''*, for the reception of rivets. As thus constructed, the tip is attached to the blade by first inserting the flange *d* within a corresponding saw-kerf formed in the front edge of the latter, and then passing a rivet through each opening, *d*, and through corresponding openings in said blade. In order to reduce the weight of the metal tip without lessening materially its effective strength, a portion of the flange *d'* is removed between each pair of rivet-holes. By this construction of the tip, and the method employed for securing the same to or within the shovel-blade, a simple, cheap, and durable cutting-edge is produced, while the work of constructing the entire device is of so simple a character as to bring it within the capacity of nearly every person.

Having thus fully set forth the nature and merits of my invention, what I claim as new is—

1. The shovel-tip D, consisting of the barbed pointed head *d* and flange *d'*, when constructed and combined with the blade A, substantially as and for the purpose specified.

2. The blade A, the back piece B, and the handle C, when the several parts are combined in the manner and for the purpose substantially as shown.

In testimony whereof I have hereunto affixed my hand this 31st day of January, 1872.

WILLIAM P. WENTWORTH.

Witnesses:

CHAS. A. HAWLEY,

WM. K. MILLER.